(12) United States Patent
Hendriks et al.

(10) Patent No.: US 7,012,876 B2
(45) Date of Patent: Mar. 14, 2006

(54) OPTICAL SCANNING HEAD

(75) Inventors: Bernardus Hendrikus Wilhelmus Hendriks, Eindhoven (NL); Jorrit Ernst De Vries, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 585 days.

(21) Appl. No.: 09/914,092

(22) PCT Filed: Dec. 20, 2000

(86) PCT No.: PCT/EP00/12980

§ 371 (c)(1),
(2), (4) Date: Aug. 21, 2001

(87) PCT Pub. No.: WO01/48745

PCT Pub. Date: Jul. 5, 2001

(65) Prior Publication Data

US 2003/0026190 A1 Feb. 6, 2003

(30) Foreign Application Priority Data

Dec. 24, 1999 (EP) .............................. 99204522

(51) Int. Cl.
*G11B 7/135* (2006.01)

(52) U.S. Cl. .............................. 369/112.24; 369/112.23; 369/112.25

(58) Field of Classification Search ............ 369/112.24, 369/112.01, 112.03
See application file for complete search history.

(56) References Cited

U.S. PATENT DOCUMENTS

| | | | | |
|---|---|---|---|---|
| 4,753,524 A | | 6/1988 | Sugiyama | 350/480 |
| 4,815,059 A | * | 3/1989 | Nakayama et al. | 369/44.24 |
| 5,260,828 A | * | 11/1993 | Londono et al. | 359/565 |
| 5,627,847 A | * | 5/1997 | Leger | 372/9 |
| 6,072,579 A | * | 6/2000 | Funato | 356/457 |
| 6,084,844 A | * | 7/2000 | Takeda | 369/112.1 |
| 6,154,326 A | * | 11/2000 | Ueyanagi et al. | 359/819 |
| 6,191,889 B1 | * | 2/2001 | Maruyama | 359/566 |
| 6,590,708 B1 | * | 7/2003 | Nakai et al. | 359/558 |

FOREIGN PATENT DOCUMENTS

EP 0632905 B1 1/1995

* cited by examiner

*Primary Examiner*—Hoa T. Nguyen
*Assistant Examiner*—Michael V. Battaglia
(74) *Attorney, Agent, or Firm*—Michael E. Belk

(57) ABSTRACT

An optical head (1) for scanning optical record carriers (2) is provided with a compensator (16) for compensating spherical aberration of the objective system (18) or defocus of the collimator lens (14) caused by operation of the optical head at a temperature different from the design temperature. A surface of the compensator (16) comprises a phase structure in the form of annular areas (52, 53, 54), the areas forming a non-periodic pattern of optical paths of different length. The optical paths change as a function of temperature and form a temperature-dependent wavefront deviation that compensates the spherical aberration and/or defocus.

20 Claims, 2 Drawing Sheets

OPTICAL SCANNING HEAD

The invention relates to an optical head for scanning an optical record carrier having an information layer, the head comprising a radiation source for generating a radiation beam, an optical system for converging the radiation beam to a focus on the information layer, the optical system imparting a temperature-dependent first wavefront deviation to the radiation beam, and a compensator arranged in the radiation beam for compensating the first wavefront deviation. The invention also relates to a set of optical elements comprising an optical element and a compensator, the optical element being arranged in the path of a radiation beam and imparting a temperature-dependent first wavefront deviation to the radiation beam, the compensator being arranged in the path of the radiation beam for compensating the first wavefront deviation.

The increase in the information density of record carriers in the field of optical recording is accompanied by a commensurate decrease of the size of the radiation spot for scanning the record carrier. The decrease of the spot size is achieved by shorter wavelengths and higher numerical apertures (NA) of the radiation beam incident on the record carrier. These factors narrow the tolerances of the optical components in an optical scanning head. In particular, the effect of environmental influences on the components becomes noticeable. Temperature changes affect the refractive index and shape of a lens, causing, amongst others, a change of the focal distance, also called defocus, and the introduction of spherical aberration. In general, an optical head comprises a collimator lens and an objective lens. The most important temperature-induced wavefront deviation for the objective lens is spherical aberration; defocus is less important because any change in the position of the focal spot will automatically be corrected by an automatic focus servo system. Since the NA of the radiation beam incident on the collimator lens is relatively small, the most important temperature-induced wavefront deviation for the collimator lens is defocus. The fixed position of the collimator lens with respect to the radiation source causes defocus to change the conjugates of the collimator lens away from the design conjugates, resulting in aberrations. The narrower tolerances limit the possibilities to employ plastic for the manufacture of the lenses because most plastics are highly susceptible to changes in temperature. Several proposals have been put forward to reduce the effect of temperature changes.

One solution is to adapt the shape of the lenses in the optical head and to choose lens materials having a specific temperature variation of the refractive index. Such an optical head is known from the U.S. Pat. No. 4,753,524. A drawback of this optical head is, that the design freedom is strongly reduced by the requirements imposed on the lens shapes and the choice of materials. It might even necessitate the use of a third lens in the optical head.

Another solution is disclosed in European patent application no. 0 632 905, in which a diffractive structure is arranged in the optical path. The structure has a temperature-dependent grating period, causing the direction of the diffracted beam to depend on the temperature. An appropriate combination of the diffractive structure and one or more lenses can reduce the effects of temperature changes. A special class of diffractive solutions is described in patent application WO 00/13048 in which stepped diffractive surfaces are employed to reduce temperature induced changes in an optical system. The stepped diffractive structure can be considered as a combination of a refractive substrate and a blazed kinoform with zero combined power. Although a grating can be designed to yield 100% efficiency, actual gratings never attain such a high efficiency. This reduction of the efficiency of the light path of the optical head is disadvantageous in optical recorders, which require a large amount of radiation energy for writing information in the record carrier. In general such periodic grating structures result in a large number of zones that are difficult to manufacture.

It is an object of the invention to provide an optical head in which the effects of temperature changes have been reduced without the above mentioned disadvantages.

This object is achieved if, according to the invention, the compensator comprises a phase structure of a material having temperature-dependent properties, the phase structure having the form of annular areas forming a non-periodic pattern of optical paths of different, temperature-dependent lengths, the optical paths forming a second wavefront deviation compensating the temperature-dependent first wavefront deviation. If the material of the phase structure and the optical paths of the annular areas are properly chosen, the phase structure of the annular areas introduce a wavefront deviation in the radiation beam having the correct shape and temperature dependence to compensate the wavefront deviation of the optical system. The phase structure does not impose restrictions on the elements of the optical system, thereby leaving a great freedom of design. An other aspect related to this freedom is that the annular areas forming the non-periodic pattern can be made relatively wide, which improves the manufacturability significantly at the expense of less perfect but still sufficient compensation of the wavefront deviation.

It should be noted, that the phase structure according to the invention has a non-periodic pattern, and, therefore, does not form diffraction orders. As a consequence, the phase structure does not have the inherent losses of a grating. The compensator is therefore very suitable for use in an optical head that requires a change in wavefront in dependence on the temperature, because the phase structure can introduce the required temperature-dependent wavefront changes without appreciable loss of radiation energy.

In a preferred embodiment the optical head comprises an objective system imparting spherical aberration as the first wavefront deviation to the radiation beam. If the thermally induced defocus is corrected for automatically by the focus servo system, the spherical aberration need only be compensated, which can advantageously be carried out by the compensator according to the invention.

In another embodiment of the optical head the optical system comprises a collimator lens and an objective lens, the collimator lens being arranged closer to the radiation source than the objective lens, the objective lens imparting defocus as the first wavefront aberration to the radiation beam. Since the collimator is used in a low-NA radiation beam, the temperature-induced spherical aberration is small and does not require compensation. The thermally induced defocus will cause the collimator lens to operate outside its design conjugates, resulting elsewhere in the optical path in aberrations such as spherical aberration. Such a defocus is preferably compensated by the compensator.

In a preferred embodiment of the optical set the differences between the optical paths at a design temperature are multiples of the first wavelength. The phase structure will not affect the radiation beam at the design temperature, whereas it will introduce a wavefront deviation in the radiation beam at different temperatures.

A preferred embodiment of the optical element includes at least one difference of optical path equal to two or more times the first wavelength. Although most wavefront deviations can be realised by using step heights between neighbouring areas equal to the first wavelength, the use of step heights of two or more times the first wavelength has the advantage that the number of areas necessary to form the wavefront deviation is reduced and the width of the areas increased. The larger areas facilitate the manufacture of the phase structure, the accuracy of which is limited by the cutting tools used for making the mould for the phase structure. The smaller areas resulting from step heights of one wavelength are difficult to manufacture accurately using the current state of the art in cutting tools. The inaccuracy of a phase structure having these smaller areas results in loss of radiation due to scattering. The larger areas according to the invention have a relatively higher accuracy and, consequently, less loss of radiation. The less accurate approximation of the desired wavefront deviation caused by the larger steps results in uncompensated aberrations. These aberration can reduce the quality of a spot formed by the radiation beam on the information layer of an optical record carrier. However, the overall performance of a scanning device using the phase structure having the large steps is better than that of a scanning device using the phase structure having the small steps. Hence by adjusting the width of the zones one can exchange the extent of the wavefront aberration correction and the ease of manufacturing.

In a special embodiment, the compensator corrects a first wavefront deviation, which has a temperature-dependence due to changes in wavelength of the radiation beam generated by the radiation source when the temperature of the radiation source changes. The change in wavelength of the radiation beam may cause dispersive optical elements to induce defocus or spherical aberration in the radiation beam.

A further aspect of the invention relates to an optical system comprising an optical element and a compensator, the optical element being arranged in the path of a radiation beam and imparting a temperature-dependent first wavefront deviation to the radiation beam, the compensator being arranged in the path of the radiation beam for compensating the first wavefront deviation, in which the compensator comprises a phase structure of a material having temperature-dependent properties, the phase structure having the form of annular areas forming a non-periodic pattern of optical paths of different, temperature-dependent lengths, the optical paths forming a second wavefront deviation compensating the temperature-dependent first wavefront deviation. The optical element is preferably an objective system or a collimator lens.

In a special embodiment of the optical system, the wavefront deviation is spherical aberration. The compensation of the spherical aberration allows the use of plastic as material for the objective lenses.

In a special embodiment of the optical system the wavefront deviation is defocus. Defocus is a wavefront deviation that is quadratic in the radius of the radiation beam. The quadratic form modulo the wavelength can be approximated by the wavefront steps introduced in the radiation beam by the annular areas. The change in focal position caused by the defocus can advantageously be used in an optical head of a recorder by compensating the thermally induced defocus of the collimator lens.

The objects, advantages and features of the invention will be apparent from the following more particular description of preferred embodiments of the invention, as illustrated in the accompanying drawings, in which FIG. 1 shows a scanning device according to the invention;

Figure 1:
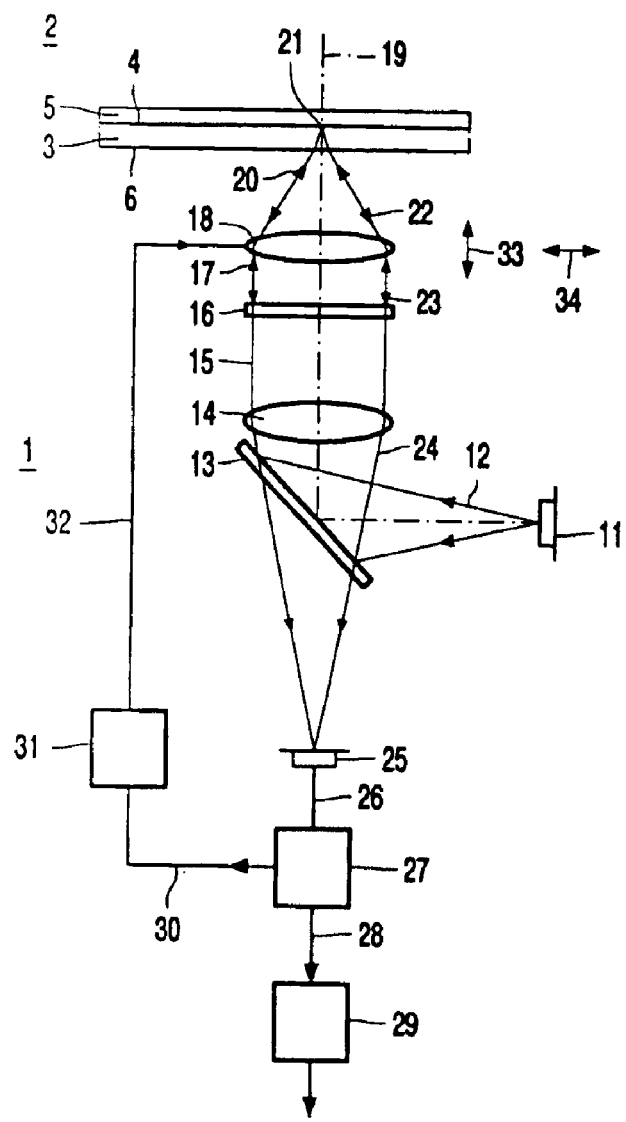

FIG. 1 shows a device 1 for scanning an optical record carrier 2. The record carrier comprises a transparent layer 3, on one side of which an information layer 4 is arranged. The side of the information layer facing away from the transparent layer is protected from environmental influences by a protection layer 5. The side of the transparent layer facing the device is called the entrance face 6. The transparent layer 3 acts as a substrate for the record carrier by providing mechanical support for the information layer. Alternatively, the transparent layer may have the sole function of protecting the information layer, while the mechanical support is provided by a layer on the other side of the information layer, for instance by the protection layer 5 or by a further information layer and a transparent layer connected to the information layer 4. Information may be stored in the information layer 4 of the record carrier in the form of optically detectable marks arranged in substantially parallel, concentric or spiral tracks, not indicated in the Figure. The marks may be in any optically readable form, e.g. in the form of pits, or areas with a reflection coefficient or a direction of magnetisation different from their surroundings, or a combination of these forms.

The scanning device 1 comprises a radiation source 11 that can emit a radiation beam 12. The radiation source may be a semiconductor laser. A beam splitter 13 reflects the diverging radiation beam 12 towards a collimator lens 14, which converts the diverging beam 12 into a collimated beam 15. The collimated beam 15 is incident on a transparent compensator 16, which modifies the wavefront of the collimated beam in dependence on the temperature in the scanning device. The beam 17 coming from the compensator 16 is incident on an objective system 18. The objective system may comprise one or more lenses and/or a grating. The objective system 18 has an optical axis 19. The objective system 18 changes the beam 17 to a converging beam 20, incident on the entrance face 6 of the record carrier 2. The objective system has a spherical aberration correction adapted for passage of the radiation beam through the thickness of the transparent layer 3. The converging beam 20 forms a spot 21 on the information layer 4. Radiation reflected by the information layer 4 forms a diverging beam 22, transformed into a substantially collimated beam 23 by the objective system 18 and subsequently into a converging beam 24 by the collimator lens 14. The beam splitter 13 separates the forward and reflected beams by transmitting at least part of the converging beam 24 towards a detection system 25. The detection system captures the radiation and converts it into electrical output signals 26. A signal processor 27 converts these output signals to various other signals. One of the signals is an information signal 28, the value of which represents information read from the information layer 4. The information signal is processed by an information processing unit for error correction 29. Other signals from the signal processor 27 are the focus error signal and radial error signal 30. The focus error signal represents the axial difference in height between the spot 21 and the information layer 4. The radial error signal represents the distance in the plane of the information layer 4 between the spot 21 and the centre of a track in the information layer to be followed by the spot. The focus error signal and the radial error signal are fed into a servo circuit 31, which converts these signals to servo control signals 32 for controlling a focus actuator and a radial actuator respectively. The actuators are not shown in the Figure. The focus actuator controls the position of the objective system 18 in the focus direction 33, thereby controlling the actual position of the spot 21 such that it coincides substantially with the plane of the information layer 4. The radial actuator controls the position of the objective lens 18 in a radial direction 34, thereby controlling the radial position of the spot 21 such that it coincides substantially with the central line of track to be followed in the information layer 4. The tracks in the Figure run in a direction perpendicular to the plane of the Figure.

The device of FIG. 1 may be adapted to scan also a second type of record carrier having a thicker transparent layer than the record carrier 2. The device may use the radiation beam 12 or a radiation beam having a different wavelength for scanning the record carrier of the second type. The NA of this radiation beam may be adapted to the type of record carrier. The spherical aberration compensation of the objective system must be adapted accordingly.

The objective system 18 shown in FIG. 1 is formed by a single lens having an NA of 0.65 for operation at a wavelength of 660 nm. The lens is made of COC (Topas). The refractive index of COC is n=1.5309, the linear expansion coefficient α is equal to 60 $10^{-6}$/K, while the change β of the refractive index as a function of temperature, i.e. β=dn/dT, is equal to −10 $10^{-5}$/K. The entrance pupil diameter of the objective lens is 3.3 mm. The thickness on the optical axis of the objective lens is 2.194 mm. Both surfaces of the objective lens are aspheric. The rotational symmetric shape can be described by the equation $$z(r)=B_2r^2+B_4r^4+B_6r^6+$$

with z being the position of the surface in the direction of the optical axis in millimeters, r the distance to the optical axis in millimeters, and $B_k$ the coefficient of the k-th power of r. The values of $B_2$ to $B_{16}$ for the surface of the objective lens facing the radiation source are 0.30688174, 0.012537039, 7.4612311 $10^{-5}$, 0.00034483975, 6.5753831 $10^{-5}$, −0.00010465506, 2.3627344 $10^{-5}$, −1.2396363 $10^{-6}$, respectively. For the surface of the objective lens facing the disk these coefficients are given by −0.1114228, 0.02852619, −0.0046668186, −0.0036752428, 0.0063619582, −0.007503492, 0.0046641069 and −0.0010757204, respectively. The distance between the objective lens and the disk is 0.990 mm. The cover layer of the disk is 0.6 mm thick and is made of Polycarbonate with refractive index n=1.5796, linear expansion coefficient a equal to. 67 $10^{-6}$/K, while the change β of the refractive index as a function of temperature, i.e. β=dn/dT, is equal to −11 $10^{-5}$/K. At the design temperature $T_0$ of 20° C. the lens has the correct spherical aberration compensation for the transparent layer 3 of the record carrier 2. When the temperature of the objective lens deviates from $T_0$, the change in shape of the lens and in the value of the refractive index causes additional spherical aberration to be introduced in the radiation beam, the amount of the aberration being proportional to the change in temperature. Since this aberration is not required for the compensation of the spherical aberration introduced by the transparent layer 3, the aberration will reduce the quality of the focal spot 21. The compensator 16 is adapted to compensate the temperature-dependent spherical aberration of the objective lens.

Figure 2:
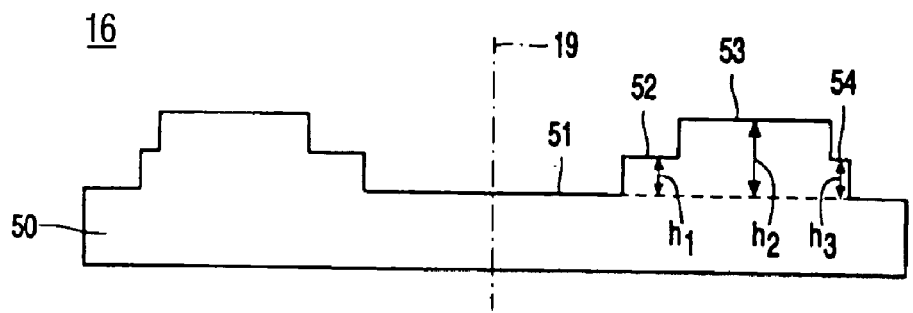
FIG. 2 shows a cross-section of the compensator.

FIG. 2 shows a cross-section of the compensator 16. The compensator comprises a transparent plate 50, one surface of which is a phase structure, which is rotationally symmetric around the optical axis 19. The phase structure has a central area 51 and four concentric annular areas 52, 53, 54 and 55. The annular areas 52, 53 and 54 are rings with a height of $h_1$, $h_2$ and $h_3$ above the height of the central area 51. The height of the areas is exaggerated with respect to the thickness and radial extent of the plate 50. The rings are made of a material having a refractive index n(T), where T is the temperature of the compensator. The plate 50 may also be made of the same material as the rings. The heights $h_j$ are each equal to $m_j h$, with $m_j$ an integer and h equal to $$h = \frac{\lambda}{n(T_0) - 1} \quad (1)$$

where λ is the wavelength and $n(T_0)$ is the refractive index of the material of the rings at the wavelength λ and the design temperature $T_0$. In this particular example the compensator is made of COC. As a result, the height h is then equal to 1.2432 μm. Since each of the annular areas introduces a phase change of a ($m_j$ 2π) in the radiation beam at the design temperature, the phase structure does not change the wavefront of the radiation beam.

When the temperature changes, the shape of the stepped phase structure will change; hence, the height of the rings will change, the amount of change depending on the linear expansion coefficient α. Since the steps have been chosen to be wide, the change in width of the annular areas has a negligible effect on the performance of the phase structure. The refractive index of the material of the structure will also change as a function of temperature, the amount of change depending on β=dn/dT. Consequently, the length of the optical paths through the annular areas will depend on the temperature of the phase structure. Note that the temperature dependence of the performance of a non-periodic phase structure is clearly different from that of a grating. The temperature dependence of a grating arises from the expansion of the zone width, while the refractive index change has no effect on the rays. For a grating a change in refractive index only affects the efficiency of a particular diffraction order.

The phase change $\phi_j$ of ring j of the structure, the ring having a height $h_j$, is now determined for a temperature change of ΔT and relative to the phase of the structure at the temperature $T_0$. If an isotropic expansion of the stepped structure is assumed, the phase change is given by $$\phi_j = 2\pi \left[ \frac{(h_j + \Delta h_j)(n + \Delta n - 1)}{\lambda} - m_j \right] = 2\pi \left[ \frac{\Delta h_j}{h} + \frac{h_j \Delta n}{h(n - 1)} \right] \quad (2)$$

where equation (1) has been used and terms quadratic in a difference have been neglected.

Furthermore, in (2) we have used that $n=n(T_0)$ and $\Delta n = n(T) - n(T_0)$. Since $$\Delta h_j = \alpha h_j \Delta T = \alpha m_j h \Delta T \quad (3)$$

and $$\Delta n = \beta \Delta T \quad (4)$$

the phase change is $$\phi_j = 2\pi \left[ \alpha + \frac{\beta}{n-1} \right] m_j \Delta T \quad (5)$$

Using the above parameter values for COC, this gives $$\phi_j = -0.00081 m_j \Delta T \quad (6)$$

Figure 3:
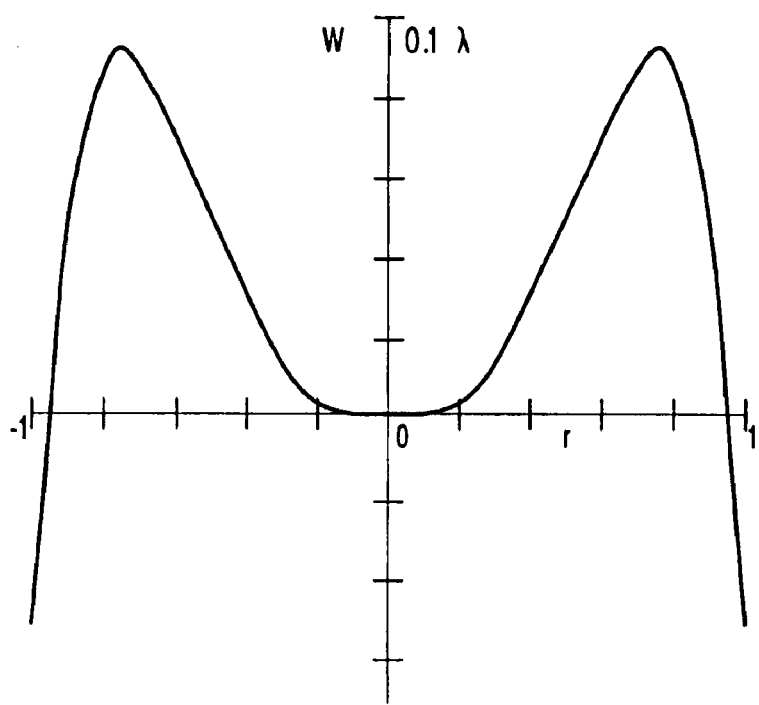
FIG. 3 shows the wavefront aberration of the objective lens at an elevated temperature.

If the optical head operates at a temperature of 50° C., i.e. ΔT=30 K, the objective lens introduces 31.2 mλ RMS temperature-induced spherical aberration. FIG. 3 shows a cross-section of the wavefront W as a function of the normalised radius r of the radiation beam. The phase change $\phi_j$ introduced by ring j of height ($m_j h$) at 50° C. is now −0.0243$m_j$ radians. The values of the integers $m_j$ for each of the rings in the phase structure must be chosen such that the phase structure will introduce a wavefront deviation that approximates the spherical aberration wavefront of FIG. 3 but with opposite sign. Table I shows the results of the optimisation by the radii of the four annular areas shown in FIG. 2, the height of each area and the relative phase of the radiation beam after passage through each area both for a temperature of 50° C. and 0° C. In the latter case ΔT=−20 K.

TABLE I

| begin area (mm) | end area (mm) | height m*h (μm) | m | $\phi_j$ (50° C.) (radians) | $\phi_j$ (0° C.) (radians) |
|---|---|---|---|---|---|
| 0.0 | 0.65 | 0 | 0 | 0 | 0 |
| 0.65 | 1.00 | −13.675 | −11 | 0.2673 | −0.1782 |
| 1.00 | 1.53 | −28.594 | −23 | 0.5589 | −0.3726 |
| 1.53 | 1.58 | −11.189 | −9 | 0.2187 | −0.1458 |

Figure 4:
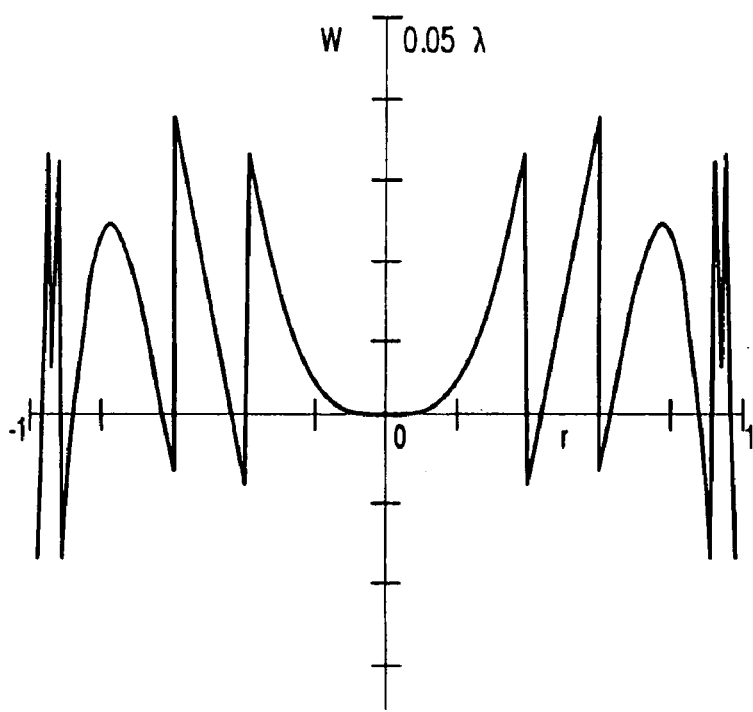
FIG. 4 shows the wavefront aberration of the combination of the objective lens and the compensator at the elevated temperature.

A negative value of the height indicates a depression in the plate 50 instead of a rise as shown in FIG. 2. FIG. 4 shows the wavefront error at 50° C. when both the objective lens and the compensator are arranged in the radiation beam. The wavefront error is now 12.3 mλ. Consequently, the compensator reduces the aberration of the objective lens caused by the temperature change from a wavefront error of 31.2 mλ to 12.3 mλ, hence a reduction of a factor of 2.5. If the same phase structure is used at 0° C., the wavefront error is reduced from 26.8 mλ to 10.0 mλ RMS, hence a reduction of a factor of 2.7. Although we have shown here only the reduction for two values of the temperature, because both the wavefront deviation introduced by the objective lens and the compensator are proportional to the temperature change, the reduction factor of approximately 2.5 will hold also for a whole range of temperature deviations around the design temperature.

Table I shows that the distribution of step height is clearly non-periodic. Furthermore, by letting the difference between subsequent values of $m_j$ be larger than one opens the possibility to make the annular areas wide, which makes the structure easier to manufacture. As a result the compensation of the temperature effect is not perfect as can be observed in FIG. 4, which show a remaining or rest wavefront aberration. Increasing the number of annular areas result in a lower rest wavefront aberration but also in a structure that is more difficult to make. The great advantage of making the structure non-periodic is that the designer can choose the right balance between complexity of the structure versus the remaining rest aberration.

The compensator 16 and the objective system 18, shown as separate elements in FIG. 1, may be integrated by arranging the phase structure 51 to 54 on a lens surface of the objective system. Preferably, the phase structure is arranged on an aspheric lens surface. If the aspheric surface is formed by a mould in a replication process, the phase structure can be incorporated in the mould. In this way the compensator can be added to the optical head at a very low additional cost.

In a second embodiment of the optical head the compensator 16 is used to compensate defocus caused by the collimator lens 14 when its temperature deviates from the design value. Since the distance between the radiation source 11 and the collimator lens 14 is fixed, the defocus will change the vergence of radiation beam 15 and, hence, the operation of the objective system 18. The compensator can be designed to introduce a temperature-dependent defocus in the radiation beam compensating the defocus of the collimator lens, following a procedure similar to the above procedure for compensating spherical aberration. The device is similar to the one shown in FIG. 1. The compensator 16 is placed in the parallel beam in front of the collimator lens 14. The collimator lens is made of COC and has an entrance pupil diameter of 3.3 mm and a numerical aperture of NA=0.15. The wavelength of the laser source is 660 nm. The thickness of the lens on the optical axis is 1.25 mm. The surfaces of the collimator lens facing the compensator is aspheric. The rotational symmetry shape can be described by the equation $$z(r)=B_2 r^2+B_4 r^4+B_6 r^6+$$

with z being the position of the surface in the direction of the optical axis in millimetres, r the distance to the optical axis in millimetres, and $B_k$ the coefficient of the k-th power of r. The values of $B_2$ to $B_6$ for the surface of the objective lens facing the radiation source are 0.085913146, 0.00026972129, 1.0285693 $10^{-6}$, respectively. The surface of the collimator lens facing the laser source is flat. The distance between the collimator lens and the exit plane of the radiation source is 10.146 mm. A change of the temperature to 50° C. results in a focus shift of 0.078 mm. Hence the distance between the radiation source and collimator lens should increase in order for the collimator lens to transform the laser beam into a parallel beam. The corresponding root mean square value of the optical path difference ($OPD_{rms}$) due to the defocus wavefront deviation is $OPD_{rms}$=0.387 λ. The phase change $\phi_j$ introduced by ring j of height $m_j h$ at 50° C. is similar to that in the first embodiment −0.0243$m_j$ radians. The values of the integers $m_j$ for each of the rings in the phase structure must be chosen such, that the phase structure will introduce a wavefront deviation that approximates the defocus wavefront arising due to collimator lens but with opposite sign. Table II shows the results of the optimisation in the form of the radii of the thirteen annular areas, the height of each area and the relative phase of the radiation beam after passage through each area for a temperature of 50° C. Due to the presence of the compensator described in Table II the defocus wavefront deviation is reduced to $OPD_{rms}$=0.035 λ, or a reduction by a factor of eleven. This reduction factor is achieved over a range of temperature changes around the design temperature, similar to the first embodiment. As a result of the non-periodic design of the structure only thirteen annular areas are required to obtain a sufficient compensation, in contrast to a structure based on stepped diffractive surfaces as described in WO00/13048, which requires more than 300 annular areas to achieve a similar result. The price to pay for this large reduction in number of annular areas is that a residual wavefront aberration remains, which, however, can be made low enough to guarantee a good operation of the system.

TABLE II

| Begin area (mm) | End area (mm) | Height m*h (μm) | m | $\phi_j$ (50° C.) (radians) |
|---|---|---|---|---|
| 0.0 | 0.2 | 0 | 0 | 0 |
| 0.2 | 0.4 | 16.162 | 13 | −0.3159 |
| 0.4 | 0.6 | 39.782 | 32 | −0.7776 |
| 0.6 | 0.8 | 79.565 | 64 | −1.5552 |
| 0.8 | 0.95 | 124.320 | 100 | −2.4300 |
| 0.95 | 1.07 | 159.130 | 128 | −3.1104 |
| 1.07 | 1.17 | 195.182 | 157 | −3.8151 |
| 1.17 | 1.27 | 232.478 | 187 | −4.5441 |
| 1.27 | 1.36 | 268.531 | 216 | −5.2488 |
| 1.36 | 1.44 | 303.341 | 244 | −5.9292 |
| 1.44 | 1.52 | 349.339 | 281 | −6.8283 |

TABLE II-continued

| Begin area (mm) | End area (mm) | Height m*h (μm) | m | $\phi_j$ (50° C.) (radians) |
|---|---|---|---|---|
| 1.52 | 1.59 | 389.122 | 313 | −7.6059 |
| 1.59 | 1.65 | 416.472 | 335 | −8.1405 |

The compensator may be integrated with the collimator lens into a single element.

The phase structures for the compensation of the spherical aberration and the defocus may be integrated in one compensator. This combined compensator may be integrated with the objective system or the collimator lens. The objective system may also comprise a grating. The number of rings in the compensator is determined by a balance between several factors. A higher number of rings reduces the rest wavefront, such as shown in FIG. 4, thereby improving the compensation. However, a higher number of rings decreases the manufacturability of the moulds. It also increases the number of steps in the phase structure, thereby increasing the loss of radiation energy by scattering on the imperfect edges of the steps.

Although the described embodiments of the compensator are used in transmission, it will be clear that the invention is also applicable to optical elements used in reflection.

In the described embodiments the effects of the wavelength change of the radiation source in dependence on the temperature has not been taken into account. It is known for instance that the wavelength of a semiconductor laser is sensitive to temperature changes. The change in wavelength is proportional to the temperature change, and can thus be written as $\gamma = d\lambda/dT$. Since a change in wavelength also affects the phase introduced by the annular steps, an additional contribution to the phase arises. Taking this term into account Equation (5) becomes then $$\phi_j = 2\pi \left[ \alpha + \frac{\beta}{n-1} - \frac{\gamma}{\lambda} \right] m_j \Delta T \quad (7)$$

and the resulting step height destribution can be adjusted accordingly. The non-periodic structure can be designed in the same way as described in the first embodiment, except that equation (7) must be used instead of (5).

What is claimed is:

1. An optical head for scanning an optical record carrier having an information layer, the head comprising a radiation source for generating a radiation beam, an optical system for converging the radiation beam to a focus on the information layer along an optical axis, the optical system imparting a temperature-dependent first wavefront deviation to the radiation beam, and a compensator arranged in the radiation beam for compensating the first wavefront deviation, characterized in that the compensator comprises a phase structure of a material having temperature-dependent properties, the phase structure having the form of a plurality of annular areas forming a non-periodic pattern of optical paths of different, temperature-dependent lengths, the optical paths forming a second wavefront deviation compensating the temperature-dependent first wavefront deviation, wherein each of the annular areas each has a width measured radially from the optical axis and a constant height along the width measured along the optical axis.

2. Optical head according to claim 1, wherein the optical system comprises an objective system imparting spherical aberration as the first wavefront deviation to the radiation beam.

3. Optical head according to claim 1, wherein the optical system comprises a collimator lens and an objective lens, the collimator lens being arranged closer to the radiation source than the objective lens, the objective lens imparting defocus as the first wavefront aberration to the radiation beam.

4. Optical head according to claim 1, wherein the differences between the optical paths are multiples of the wavelength of the radiation beam for at least one temperature.

5. Optical head according to claim 4, wherein at least one of the multiples is equal to two or larger.

6. Optical head according to claim 1, wherein the temperature-dependence of the first wavefront deviation is due to the temperature dependence of the wavelength of the radiation beam generated by the radiation source.

7. A device for scanning an optical record carrier having an information layer, the device comprising an optical head according to claim 1 and an information processing unit for error correction.

8. Optical head according to claim 1, wherein the heights of the annular areas differ forming a step pattern proceeding radially from the optical axis.

9. Optical head according to claim 1, wherein widths of the annular areas are substantially greater than the heights.

10. Optical head according to claim 1, wherein the annular areas cause an integral number of 2π phase changes in the radiation beam.

11. An optical system comprising an optical element and a compensator, the optical element being arranged in the path of a radiation beam along an optical axis and imparting a temperature-dependent first wavefront deviation to the radiation beam, the compensator being arranged in the path of the radiation beam for compensating the first wavefront deviation, characterized in that the compensator comprises a phase structure of a material having temperature-dependent properties, the phase structure having the form of a plurality of annular areas forming a non-periodic pattern of optical paths of different, temperature-dependent lengths, the optical paths forming a second wavefront deviation compensating the temperature-dependent first wavefront deviation, wherein each of the annular areas has a width measured radially from the optical axis and a constant height along the width measured along the optical axis.

12. Optical systemaccording to claim 11, wherein the differences between the optical paths are multiples of the wavelength of the radiation beam for at least one temperature.

13. Optical system according to claim 11, wherein the first wavefront deviation is spherical aberration.

14. Optical system according to claim 11, wherein the first wavefront deviation is defocus.

15. Optical system according to claim 11, wherein the optical element is a lens.

16. Optical system according to claim 11, wherein the optical element and the compensator are integrated in a single element.

17. Optical system according to claim 11, including a diffractive structure.

18. Optical system according to claim 11, wherein the heights of the annular areas differ forming a step pattern proceeding radially from the optical axis.

19. Optical system according to claim 11, wherein widths of the annular areas is substantially greater than the heights.

20. Optical system according to claim 11, wherein the annular areas cause an integral number of 2π phase changes in the radiation beam.

* * * * *